Patented Mar. 9, 1937

2,073,125

UNITED STATES PATENT OFFICE 2,073,125

PROCESS FOR REGULATING THE HYDROGEN ION CONCENTRATION OF FERMENTATION MASHES

Hugh R. Stiles, Terre Haute, Ind., assignor to Commercial Solvents Corporation, Terre Haute, Ind., a corporation of Maryland No Drawing. Application October 2, 1933, Serial No. 691,889

8 Claims. (Cl. 195—44)

My invention relates to an improved method for the regulation of hydrogen ion concentration of fermentation mashes. More specifically, my invention relates to the addition of neutralizing agents to fermentation mashes prior to their inoculation to secure an improved regulation of the hydrogen ion concentration during the fermentation.

It is known that in a number of fermentation processes, particularly those in which intermediate products and/or end products of an acidic nature are produced, the metabolic functions of the organism are favored by a hydrogen ion concentration in the mash lower than that secured by the normal activity of the microorganisms themselves. In such cases, it has been customary to add to the mash an insoluble neutralizing agent such as calcium carbonate, barium carbonate or the like. With a material of this nature present in the mash, the hydrogen ion concentration secured by the action of the bacteria approaches more closely the desired value. It has been noted in many fermentations of this nature that maximum yields are obtained only when the final hydrogen ion concentration secured by the action of the bacteria falls within a rather narrow optimum range. The optimum value can, in some cases, be obtained simply by the use of an excess of coarsely ground calcium carbonate. In case of other fermentations, however, this has been found under certain circumstances to be insufficient. For example, in copending application Serial No. 710,897 by D. A. Legg and H. R. Stiles, filed February 12, 1934, it is shown that in certain circumstances very finely divided calcium carbonate must be employed in order to secure optimum yields.

However, there are a number of fermentations which require for maximum yields a final hydrogen ion concentration even lower than that secured by the bacteria when finely divided calcium carbonate is present in the mash. A typical fermentation of this type is the butyl-acetonic fermentation of inverted carbohydrate mashes by means of organisms of the type *Clostridium inverto-acetobutylicum* (described in copending application Serial No. 675,458 by D. A. Legg and H. R. Stiles, filed June 12, 1933).

The bacteria designated in this application as *Clostridium inverto-acetobutylicum* comprise any bacteria having the following characteristics:

I. Morphological
  A. Rod-shaped
  B. Spore-forming—Clostridia and Plectridia
  C. Practically indistinguishable from members of the *Clostridium butyricum* group II. Biochemical
  A. Carbohydrate fermentation
    1. Inability to produce appreciable yields of butyl alcohol and acetone from starch as the only source of carbohydrate
    2. Inability to produce appreciable yields of butyl alcohol and acetone from sucrose as the only source of carbohydrate
    3. Inability to consistently produce yields greater than 20% on the weight of the sugar from uninverted molasses
    4. Ability to produce high yields of butyl alcohol and acetone from glucose or inverted molasses
  B. Nitrogen metabolism
    1. Ability to produce high yields of butyl alcohol and acetone in sugar media containing ammonia as the principal source of nitrogen
    2. Ability to utilize degraded protein (including ammonia) as the sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 25° C. to 36° C., preferably 29° C. to 31° C.
  E. Hydrogen ion concentration for solvent production
    1. Final pH of 5.0–6.5, preferably 5.7–6.1

The optimum hydrogen ion concentration for this fermentation is somewhat more critical than in the usual types of fermentation having acidic intermediate products, and the yield will be found to drop markedly if the final hydrogen ion concentration secured by the action of the bacteria varies only slightly from the optimum. Numerous attempts have been made to secure a better regulation of the hydrogen ion concentration in fermentations of this type, but until the present time all of these attempts have failed. For example, continuous or intermittent introduction of neutralizing agents during the fermentation has been unsatisfactory, owing to the mechanical difficulties involved. A large excess of insoluble neutralizing agent was found to have no beneficial effect and in some cases actually a detrimental effect. It was thought that the addition of a soluble alkaline material to the mash prior to inoculation might have a beneficial effect, but such materials as sodium carbonate, sodium silicate, trisodium phosphate, and borax were found to be ineffective.

However, I have now found that, although most soluble alkaline materials are unsuitable for this purpose, ammonia or a basic ammonium salt, when added to the fermentation mash in addition to the insoluble neutralizing agent, gives rise to markedly improved results. The final hydrogen ion concentration in the mash, secured by the action of the bacteria when both an insoluble neutralizing agent and a basic ammonium compound are present, is considerably lower than that previously obtainable with any degree of consistency, resulting in substantially higher yields than those previously obtainable. The theory according to which my invention operates is not definitely understood, but at least it is clear that the improved results are not due to the nutrient value of the added ammonia. Improved yields are obtained, according to my invention, in mashes in which a sufficient amount of ammonia for nutrient purposes is already present in the form of a neutral salt.

My invention may probably best be illustrated by the following specific example: A molasses mash containing 323 grams of Louisiana molasses (165.2 grams of sugar) in 795 c. c. of water was inverted by heating with 3.85 c. c. of 95% sulphuric acid for 40 minutes at 20 lbs. pressure. At the conclusion of the inversion the acid was partially neutralized by means of 6.45 c. c. of ammonium hydroxide containing 21.4% $NH_3$, and 18 grams of precipitated calcium carbonate were then added. This calcium carbonate served to neutralize the remaining sulphuric acid and to supply an excess for neutralizing purposes during the fermentation. The mash was then diluted to a volume of 3100 c. c. and sterilized for 30 minutes at 20 lbs. pressure. Duplicate fermentations of the above quantity of mash in 4 liter flasks were carried out in each case. If ammonia (in the form of ammonium hydroxide) was utilized as the additional neutralizing agent, this was added aseptically after sterilization. If ammonium salts were used, these were added to the mash prior to sterilization. All of the flasks were inoculated with 4% of an active culture of the type *Clostridium inverto-acetobutylicum* and incubated at 30° C. The results of the fermentations are reported in the table below.

Table

| No. | Additional neutralizing agent grams per liter | Final pH | Solvent yield percent on sugar | Solvent ratio | | |
|---|---|---|---|---|---|---|
| | | | | Butyl alcohol percent | Acetone percent | Ethyl alcohol percent |
| 1 | None | 5.65 | 25.9 | 69.9 | 27.7 | 2.4 |
| 2 | $(NH_4)_2HPO_4$ 0.67 g. | 5.90 | 30.5 | 68.6 | 29.1 | 2.3 |
| 3 | $(NH_4)_2HPO_4$ 1.33 g. | 6.00 | 30.5 | 68.6 | 29.2 | 2.2 |
| 4 | $(NH_4)_2HPO_4$ 2.00 g. | 6.05 | 30.1 | 68.1 | 29.5 | 2.4 |
| 5 | $(NH_4)_2CO_3$ 1.33 g. | 6.03 | 29.2 | 67.4 | 30.5 | 2.1 |
| 6 | $(NH_4)_2CO_3$ 2.00 g. | 6.15 | 28.3 | 66.4 | 30.5 | 3.1 |
| 7 | $NH_3$ 0.14 g. | 5.75 | 29.2 | 67.4 | 30.0 | 2.6 |
| 8 | $NH_3$ 0.21 g. | 5.76 | 30.2 | 67.7 | 30.1 | 2.2 |
| 9 | $NH_3$ 0.28 g. | 5.83 | 30.4 | 67.1 | 30.8 | 2.1 |

It may be seen from the above results that, when practicing my invention, the final pH in the mash falls within the range 5.7–6.1, the optimum range for organisms of this group, and that the yields obtained in these fermentations were markedly improved. It should be noted that in any particular case there is an optimum concentration of the ammonium compound employed. Amounts in excess of this value, while further decreasing the final hydrogen concentration, apparently tend to decrease the yields somewhat. The amount of the ammonium compound to be employed in any particular mash may readily be determined by one skilled in the art by simple preliminary experiments. This amount may be found to vary in different cases, depending upon the concentration of similar materials in the molasses or other raw material employed, but in general it will be found to fall within the range 0.1–0.3 gram per liter of $NH_3$ or its equivalent in the form of a basic ammonium salt. For example, 0.1–0.3 gram of $NH_3$, in the form of $NH_4OH$, per liter or 0.3–1.5 grams of $(NH_4)_2HPO_4$ per liter will usually be found to be satisfactory. In any case, an amount of the basic ammonium compound substantially smaller than the amount of insoluble neutralizing agent should be employed.

It is to be understood, of course, that my invention is not to be limited to the particular example given above. This example was illustrative only, and my invention is applicable to various other types of mashes and fermentation processes. For example, my invention may be applied to the fermentation of any mash prepared in the usual manner which contains a fermentable carbohydrate and suitable nutrients for the bacteria to be employed. Likewise, my invention may be carried out in conjunction with the use of any substantially water-insoluble, non-toxic neutralizing agent. Although the particular example given above was limited to the use of bacteria of the type *Clostridium inverto-acetobutylicum*, it will be evident to those skilled in the art that my invention is applicable to a number of other fermentations in which acidic intermediate products and/or end products are produced. In general, it may be said that my invention is applicable to fermentations by means of organisms whose metabolic functions are favored by a hydrogen ion concentration lower than that obtaining when an excess of an insoluble neutralizing agent in the mash constitutes the only means for hydrogen ion control.

As used in the appended claims, the term "basic ammonium compound" is to be taken as including ammonia itself either in the gaseous form or in solution as ammonium hydroxide. By the term "substantially water-insoluble basic neutralizing agent", as used herein and in the appended claims, is meant an alkaline neutralizing agent sufficiently insoluble so that the hydroxyl ion concentration of a mash containing an excess of such neutralizing agent over that required to neutralize any initial acidity in the absence of soluble alkaline materials does not exceed neutrality.

My invention now having been described, what I claim is:

1. In a process for the fermentation of a carbohydrate mash by means of bacteria whose metabolic functions are favored by a hydrogen ion concentration lower than that obtained by the use of an excess of an insoluble basic neutralizing agent over that required to neutralize any initial acidity, the improvement which comprises carrying out the fermentation in the presence of said excess of a substantially water-insoluble, non-toxic neutralizing agent and approximately 0.2 gram per liter NH₃ equivalent of a basic ammonium compound.

2. In a process for the fermentation of a carbohydrate mash by means of bacteria whose metabolic functions are favored by a hydrogen ion concentration lower than that obtained by the use of an excess of an insoluble basic inorganic neutralizing agent over that required to neutralize any initial acidity, the improvement which comprises carrying out the fermentation in the presence of said excess of a substantially water-insoluble, non-toxic neutralizing agent and from 0.1-0.3 gram per liter NH₃ equivalent of a basic ammonium compound.

3. In a process for the fermentation of a carbohydrate mash by means of bacteria whose metabolic functions are favored by a hydrogen ion concentration lower than that obtained by the use of an excess of an insoluble neutralizing agent over that required to neutralize any initial acidity, the improvement which comprises carrying out the fermentation in the presence of said excess of precipitated calcium carbonate and from 0.1-0.3 gram per liter NH₃ equivalent of a basic ammonium compound.

4. In a process for the production of normal butyl alcohol, acetone, and ethyl alcohol by the fermentation of an inverted carbohydrate mash by means of bacteria of the group *Clostridium inverto-acetobutylicum*, the improvement which comprises carrying out the fermentation in the presence of an excess of a substantially water-insoluble, non-toxic basic neutralizing agent over that required to neutralize acidity and approximately 0.2 gram per liter NH₃ equivalent of a basic ammonium compound.

5. In a process for the production of normal butyl alcohol, acetone, and ethyl alcohol by the fermentation of an inverted carbohydrate mash by means of bacteria of the group *Clostridium inverto-acetobutylicum*, the improvement which comprises carrying out the fermentation in the presence of an excess of a substantially water-insoluble, non-toxic basic inorganic neutralizing agent over that required to neutralize any initial acidity and from 0.1-0.3 gram per liter NH₃ equivalent of a basic ammonium compound.

6. In a process for the production of normal butyl alcohol, acetone, and ethyl alcohol by the fermentation of an inverted carbohydrate mash by means of bacteria of the group *Clostridium inverto-acetobutylicum*, the improvement which comprises carrying out the fermentation in the presence of an excess of precipitated calcium carbonate over that required to neutralize any initial acidity and from 0.1-0.3 gram per liter NH₃ equivalent of a basic ammonium compound.

7. In a process for the production of normal butyl alcohol, acetone, and ethyl alcohol by the fermentation of an inverted carbohydrate mash by means of bacteria of the group *Clostridium inverto-acetobutylicum*, the improvement which comprises regulating the hydrogen ion concentration of the mash by means of an excess of substantially water-insoluble, non-toxic basic inorganic neutralizing agent over that required to neutralize any initial acidity and from 0.1-0.3 gram per liter NH₃ equivalent of a basic ammonium compound whereby the final hydrogen ion concentration secured by the action of the bacteria falls within the range pH 5.7 and pH 6.1.

8. In a process for the production of normal butyl alcohol, acetone, and ethyl alcohol by the fermentation of an inverted carbohydrate mash by means of bacteria of the group *Clostridium inverto-acetobutylicum*, the improvement which comprises regulating the hydrogen ion concentration of the mash by means of an excess of precipitated calcium carbonate over that required to neutralize any initial acidity and from 0.1-0.3 gram per liter NH₃ equivalent of a basic ammonium compound whereby the final hydrogen ion concentration secured by the action of the bacteria falls within the range pH 5.7 and pH 6.1.

HUGH R. STILES.